(12) United States Patent
Hope et al.

(10) Patent No.: US 8,812,476 B2
(45) Date of Patent: Aug. 19, 2014

(54) SYSTEM FOR LOCATING AN OBJECT OWNER

(71) Applicant: Save This Life, Inc., Austin, TX (US)

(72) Inventors: Lucy Byrd Hope, Austin, TX (US); Christian Robert White, Austin, TX (US)

(73) Assignee: Save This Life, Inc., Austin, TX (US)

( * ) Notice: Subject to any disclaimer, the term of this patent is extended or adjusted under 35 U.S.C. 154(b) by 0 days.

(21) Appl. No.: 13/795,162

(22) Filed: Mar. 12, 2013

(65) Prior Publication Data

US 2013/0332439 A1 Dec. 12, 2013

Related U.S. Application Data

(60) Provisional application No. 61/656,854, filed on Jun. 7, 2012.

(51) Int. Cl.
*G06F 7/00* (2006.01)
*G06F 17/30* (2006.01)

(52) U.S. Cl.
CPC .... *G06F 17/30864* (2013.01); *G06F 17/30876* (2013.01)
USPC .......................................... 707/706; 707/899

(58) Field of Classification Search
None
See application file for complete search history.

(56) References Cited

U.S. PATENT DOCUMENTS

| | | | | |
|---|---|---|---|---|
| 2,812,601 | A * | 11/1957 | Hines | 40/634 |
| 4,271,352 | A * | 6/1981 | Thomas | 235/375 |
| 4,650,219 | A * | 3/1987 | Sigman | 283/70 |
| 5,036,610 | A * | 8/1991 | Fehr | 40/300 |
| 5,163,711 | A * | 11/1992 | Philips et al. | 283/101 |
| 5,570,081 | A * | 10/1996 | Holstrom | 340/573.3 |
| 5,816,620 | A * | 10/1998 | Buell | 283/74 |
| 6,064,307 | A * | 5/2000 | Silver | 340/573.1 |
| 6,095,567 | A * | 8/2000 | Buell | 283/75 |
| 6,259,367 | B1 * | 7/2001 | Klein | 340/572.1 |
| 6,424,727 | B1 | 7/2002 | Musgrave et al. | |
| 6,533,172 | B1 * | 3/2003 | Popp | 235/380 |
| 6,546,088 | B2 * | 4/2003 | Campbell | 379/90.01 |
| 6,661,344 | B2 * | 12/2003 | Bowling | 340/573.3 |
| 6,950,024 | B2 * | 9/2005 | Wunderlick | 340/573.1 |
| 6,967,577 | B2 * | 11/2005 | Taylor et al. | 340/572.1 |
| 7,318,069 | B2 * | 1/2008 | Takahashi et al. | 1/1 |
| 7,420,465 | B2 * | 9/2008 | Ritter | 340/539.32 |
| 7,978,068 | B1 | 7/2011 | Caplan et al. | |
| 2004/0049396 | A1 | 3/2004 | Hope | |
| 2005/0075097 | A1 | 4/2005 | Lehikoinen et al. | |
| 2006/0055538 | A1 | 3/2006 | Ritter | |
| 2009/0160618 | A1 | 6/2009 | Kumagai et al. | |
| 2010/0223245 | A1 * | 9/2010 | Vermilye | 707/706 |

OTHER PUBLICATIONS

PCT International Search Report and Written Opinion of PCT International Application No. PCT/US13/30552; mailed Aug. 22, 2013; 14 pages.

* cited by examiner

*Primary Examiner* — Michael Hicks

(74) *Attorney, Agent, or Firm* — Moore & Van Allen PLLC; Nicholas C. Russell

(57) ABSTRACT

Systems, methods, and computer program products are provided for locating an object owner. The system provides a microchip database that stores a plurality of microchip records containing microchip identification codes, owner contact information and the like. Microchips are embedded in objects such that when the object is scanned the microchip identification code can be retrieved and used to search and retrieve contact information from the microchip database using one or more search engines. When using the microchip identification code to conduct a search a link to a website displaying information associated with the microchip record is presented first in the list of search results.

23 Claims, 15 Drawing Sheets

SEARCH ENGINE [ 900164000004112 1002 ] 🔍

Web    Images    Maps    Shopping 1 result (0.12 seconds)

900164000041142 – MICROCHIP RECORDS WEBSITE 1004
microchiprecords.com/900164000004112
May 24, 2012 – Microchip #: 900164000004112 Pet's Name: Maya Microchip Company: Microchip Company Name Gender: Female Breed: Ibizian Hound Birthdate:....

Maya
Maya. Posted by Admin of Dec 14, 2012 | Comments Off....

More results from microchiprecords.com >>

1000

*FIG. 10*

SYSTEM FOR LOCATING AN OBJECT OWNER

CLAIM OF PRIORITY UNDER 35 U.S.C. §119

This Non-provisional patent application claims priority to U.S. Provisional Patent Application Ser. No. 61/656,854 filed Jun. 7, 2012, entitled "System for Locating an Object Owner" assigned to the assignee hereof and hereby expressly incorporated by reference herein.

BACKGROUND

Current technology allows for identification systems that may identify objects, such as pets, if they become lost. Typically, the pet may be microchipped and identified using that microchip. However, many times these recovery systems fail and the object that has been microchipped cannot be identified. Failures in these systems may include the finding party not knowing that the recovery services exist, the finding party having difficulty finding owner information, etc.

These systems often waste a considerable amount of time trying to identify a missing object's origin. Typically, an object may be microchipped and registered in a microchip vendor's database along with contact information associated with the object owner, but this information is virtually useless if the object owner or individuals who located the lost objects have no way to access it. Furthermore, it may be necessary to know the particular microchip manufacturer prior to determining which database needs to be searched, but many object owners or object finders have no idea who manufactured a microchip or the microchip number associated therewith. Objects for which this information is not available may never be reunited with their owner.

Therefore a need exists for an object recovery system that allows microchip information to be easily accessible and made globally available via general search engines.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems, and computer program products are defined that provide for locating an object owner. The system includes a non-transitory computer-readable storage medium including computer-readable program code and a processor coupled to the computer readable storage medium configured to execute the computer readable program code. In accordance with embodiments herein disclosed, the invention may provide a microchip database having one or more microchip records stored therein. In one embodiment, the microchip database may be queried using one or more search engines.

Additionally, the invention may provide a microchip identification code such that the microchip identification code is associated with a microchip. In one embodiment, the microchip identification code may be an alphanumeric code. In one embodiment, the microchip may be implanted into an object. In one embodiment of the invention, the object may be an animal. In such an embodiment, the microchip may be implanted subcutaneously between the animal's shoulder blades. According to one embodiment of the invention the microchip may emit a unique signal when scanned by a scanning device such that the microchip identification code is displayed on the scanning device. According to another embodiment of the invention the system may provide an object tag such that the microchip identification code is displayed on the object tag. In one embodiment the object tag may be attached to the object.

Furthermore, the invention may create a microchip record to be stored in the microchip database. In one embodiment, the microchip record may comprise an object name, an object photo, and object handling guidelines. In one embodiment, the microchip record is associated with the microchip identification code such that when querying the microchip database, using the plurality of search engines, the microchip record is listed first in one or more search results. In another embodiment, the microchip record comprises contact information associated with the object owner. According to one embodiment of the invention when querying the microchip database may comprise using the microchip identification code as a search term in the plurality of search engines. According to one embodiment, the system may provide a user interface such that the user is able to enter information to be associated with the microchip record. According to another embodiment the system may repeatedly post the microchip record to one or more blog websites. In yet another embodiment, the system may create a website, wherein the website is associated with the microchip database such that the microchip records are posted on the website. In such an embodiment, the website may comprise built-in search capabilities for querying the microchip database.

A further embodiment of the invention is defined by a computer program product that includes a computer-readable medium. The computer-readable medium includes a first program code portion operable to provide a microchip database having one or more microchip records stored therein. In one embodiment, the microchip database may be queried using one or more search engines. The computer-readable medium additionally includes a second program code portion operable to provide a microchip identification code such that the microchip identification code is associated with a microchip. In one embodiment, the microchip may be implanted into an object. The computer-readable medium additionally includes a third program code portion operable to create a microchip record to be stored in the microchip database. In one embodiment, the microchip record is associated with the microchip identification code such that when querying the microchip database, using the plurality of search engines, the microchip record is listed first in one or more search results. In another embodiment, the microchip record may comprise contact information associated with the object owner.

In further embodiments of the invention, the medium may additionally include a fourth program code portion operable to cause a microchip to emit a unique signal when scanned by a scanning device such that the microchip identification code is displayed on the scanning device.

In further embodiments of the invention, the medium may additionally include a fourth program code portion operable to provide an object tag such that the microchip identification code is displayed on the object tag. In one embodiment, the object may be a tag attached to the object.

In further embodiments of the invention, the medium may additionally include a fourth program code portion operable to provide a user interface such that the user is able to enter information to be associated with the microchip record.

In further embodiments of the invention, the medium may additionally include a fourth program code portion operable to repeatedly post the microchip record to one or more blog websites.

In further embodiments of the invention, the medium may additionally include a fourth program code portion operable to create a website. In one embodiment, the website may be associated with the microchip database such that the microchip records are posted on the website. In one embodiment, the website may comprise built-in search capabilities for querying the microchip database.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
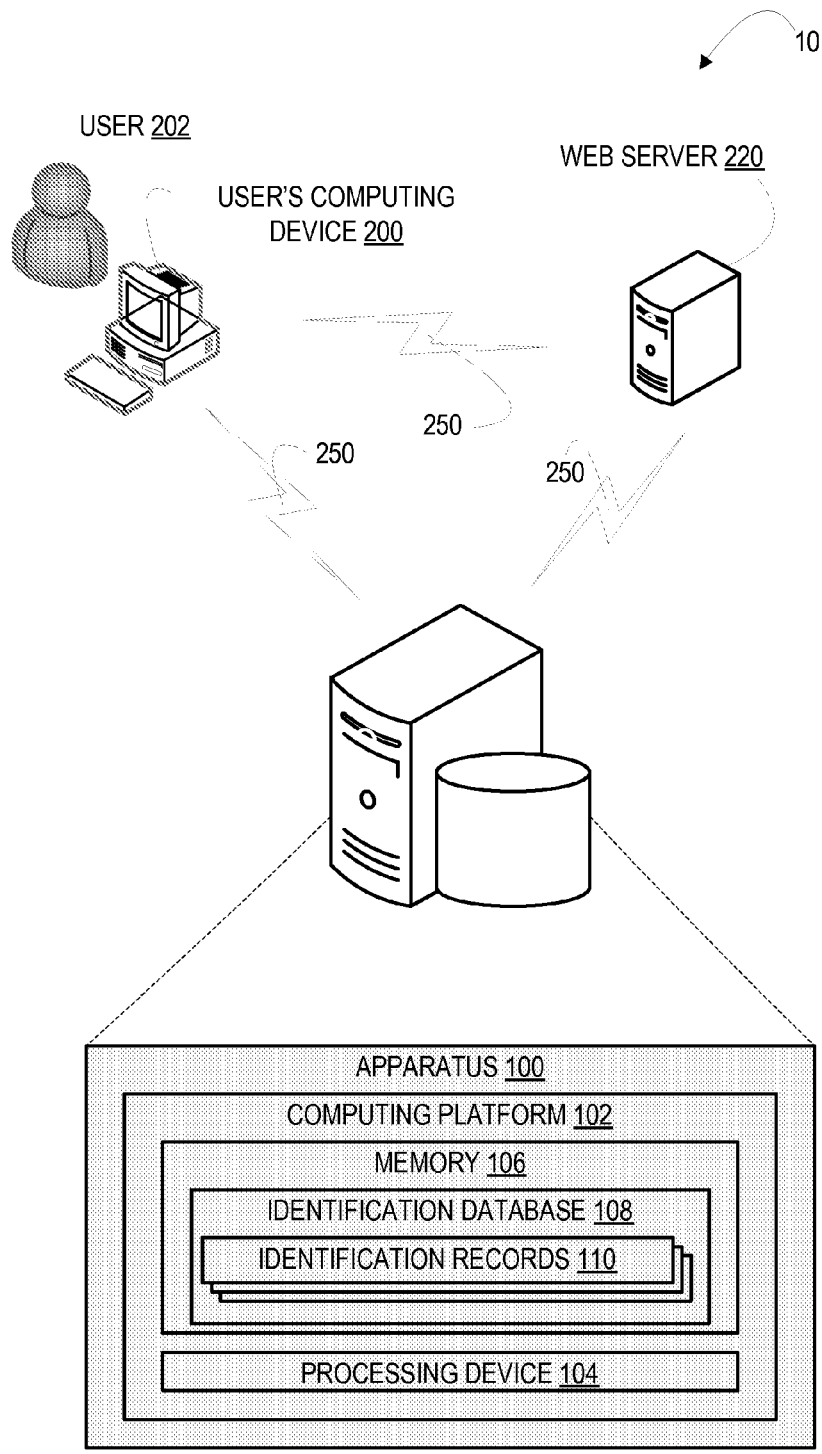
Figure 2:
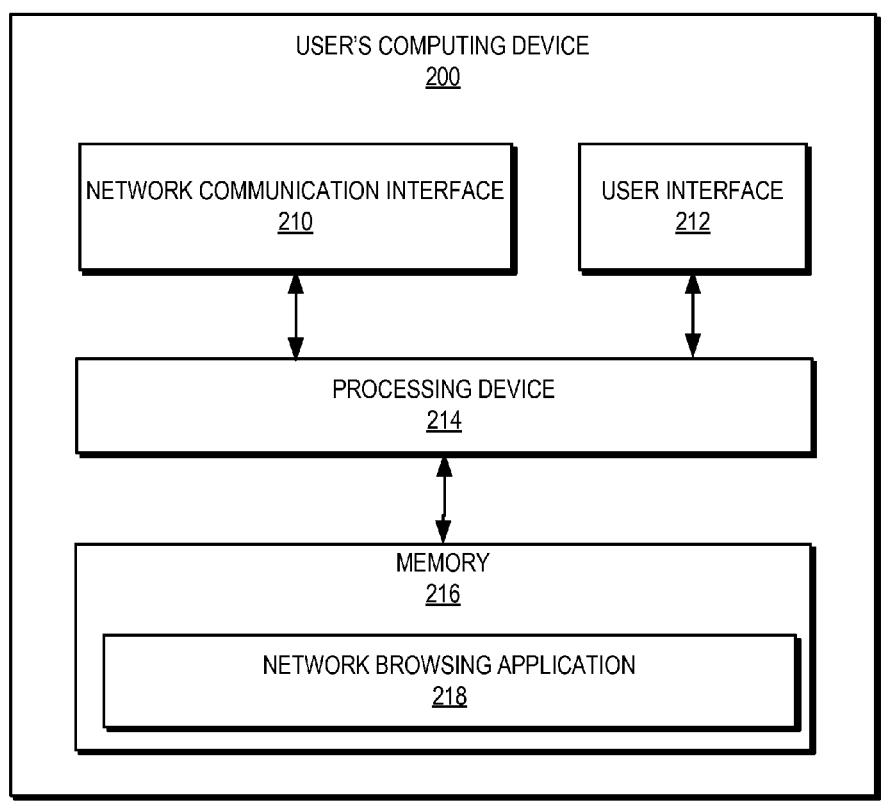
Figure 3:
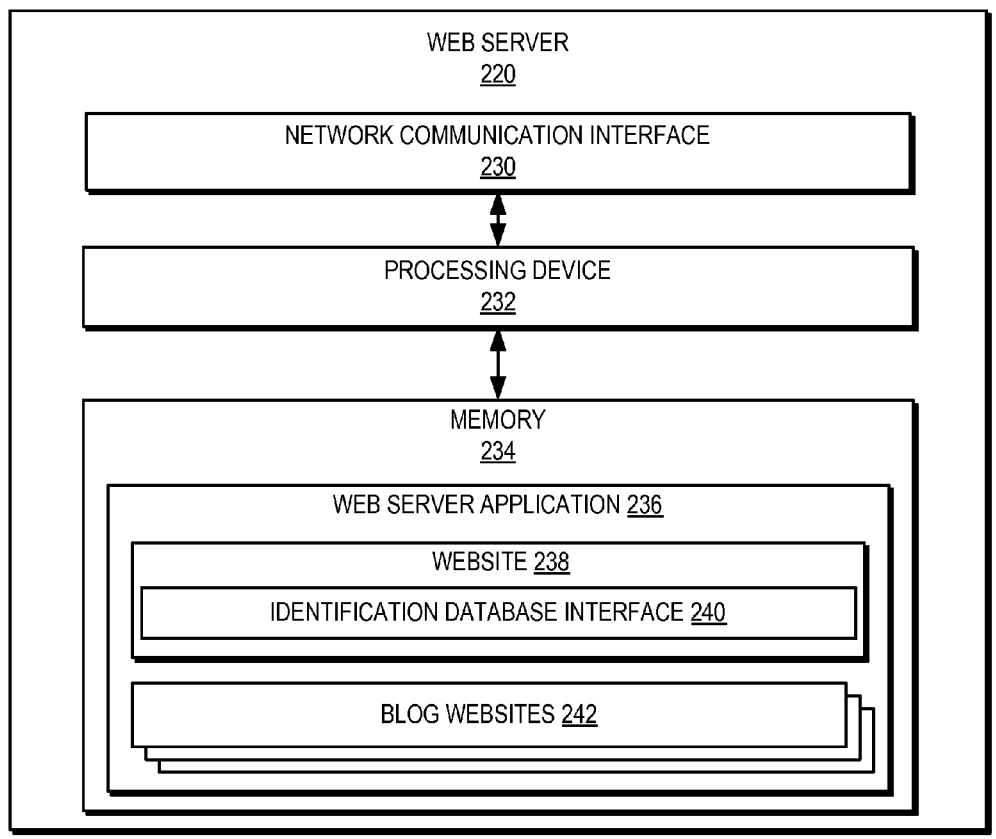
Figure 4:
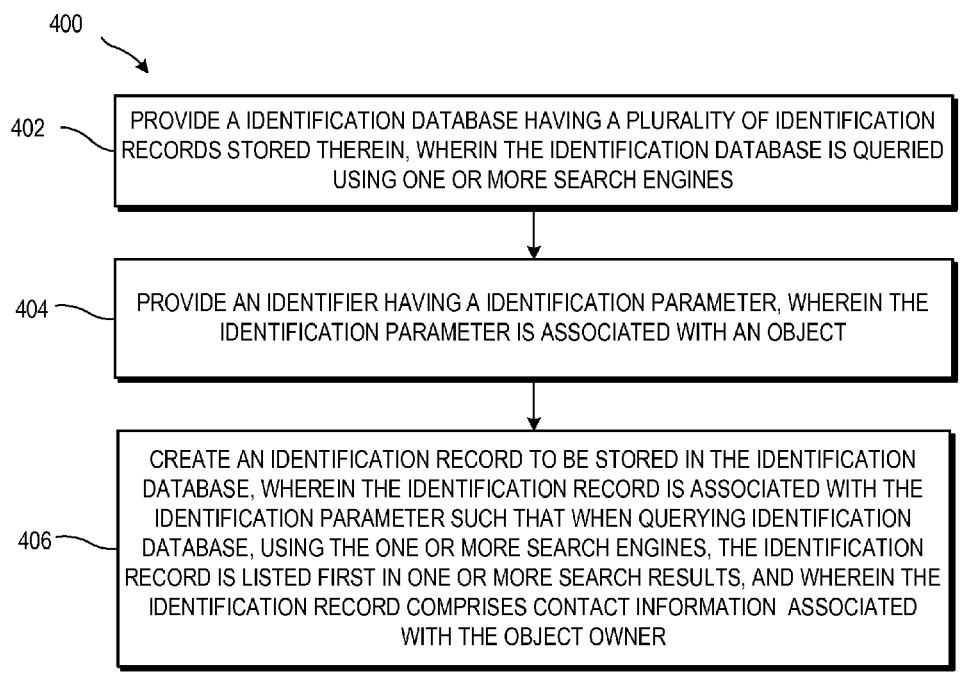
Figure 5:
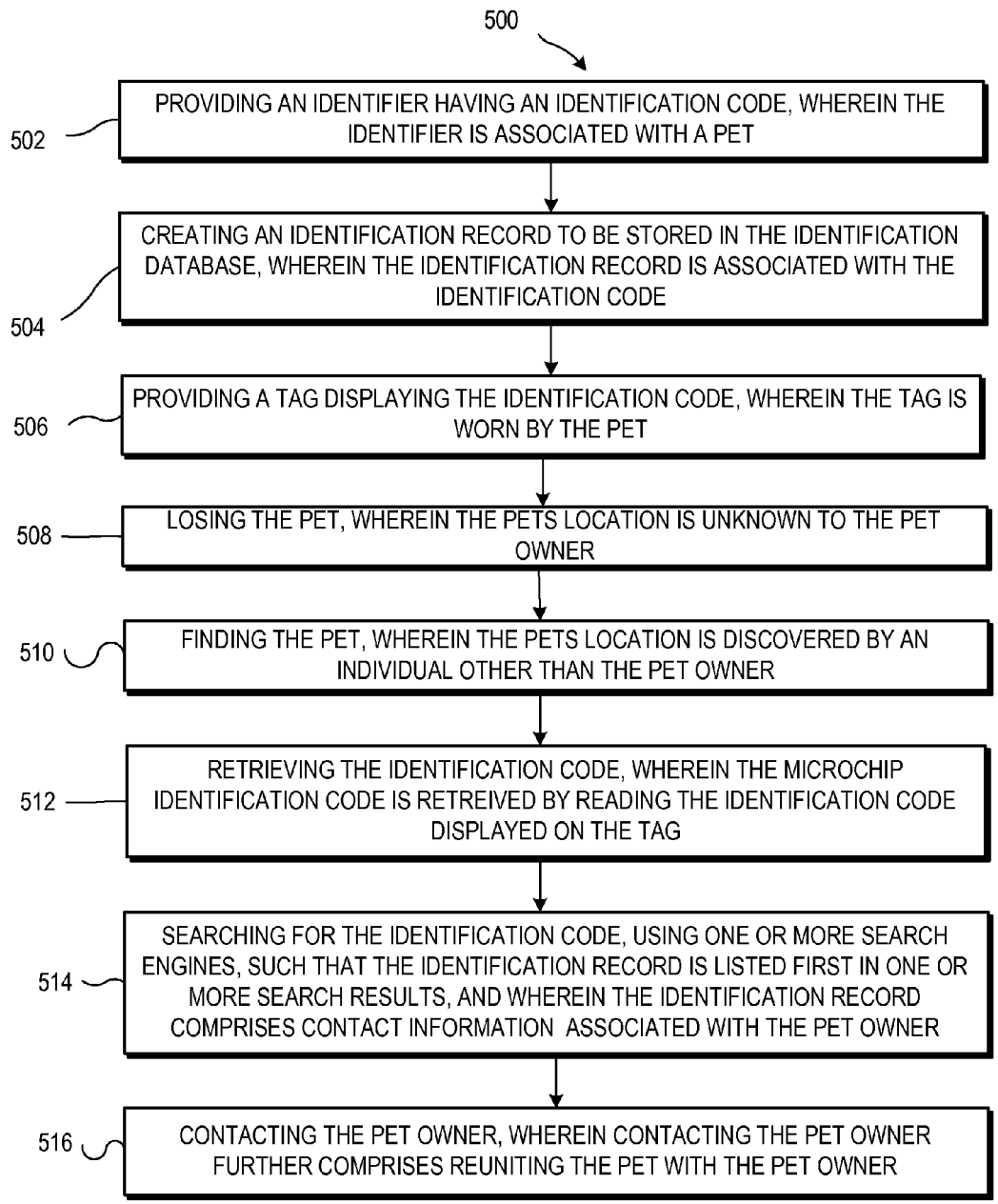
Figure 6:
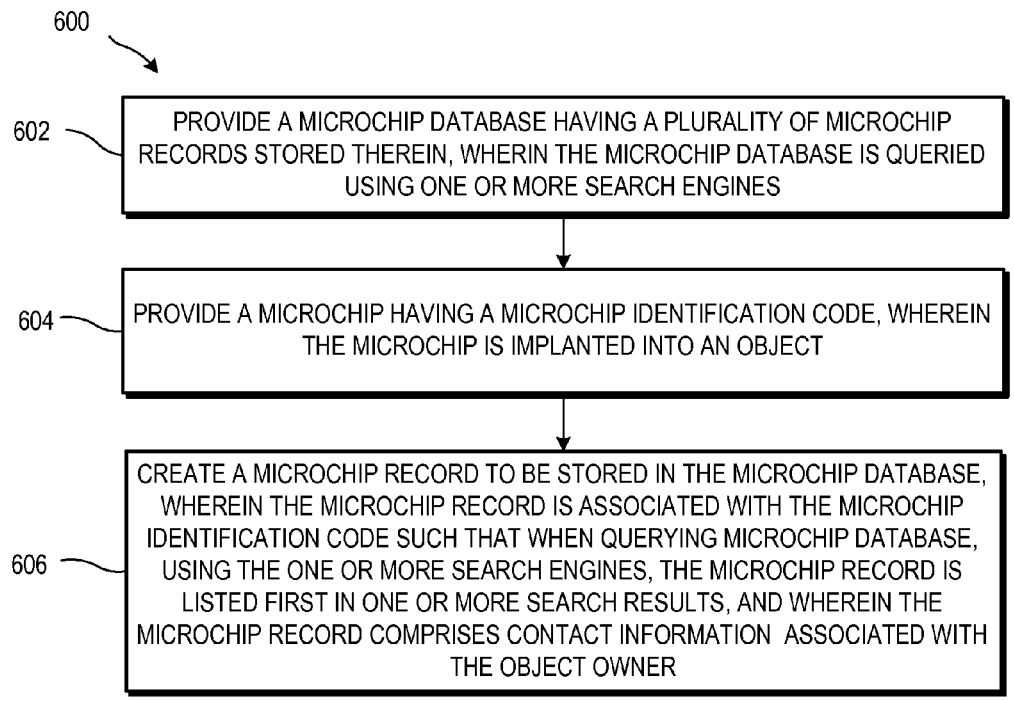
Figure 7A:
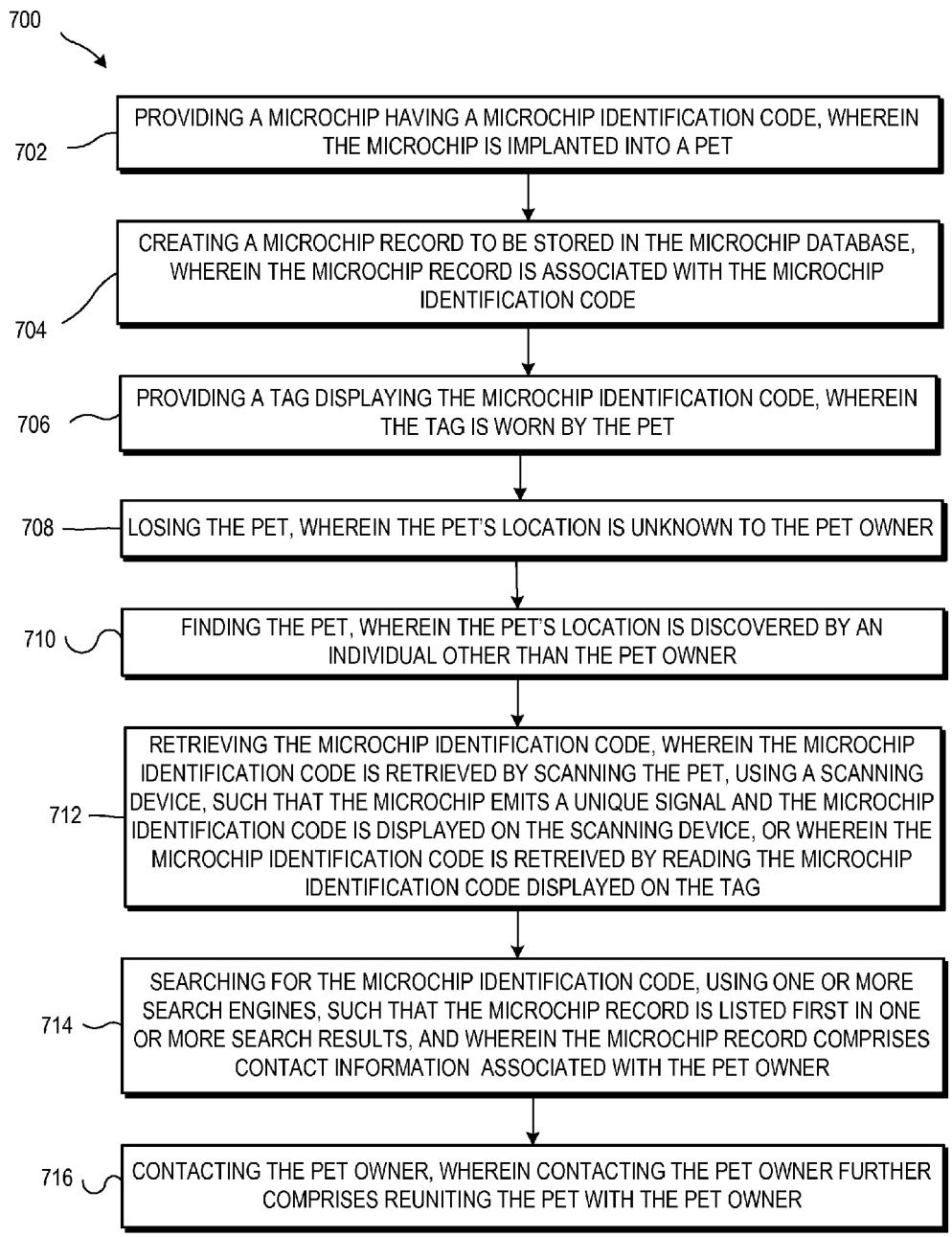
Figure 7B:
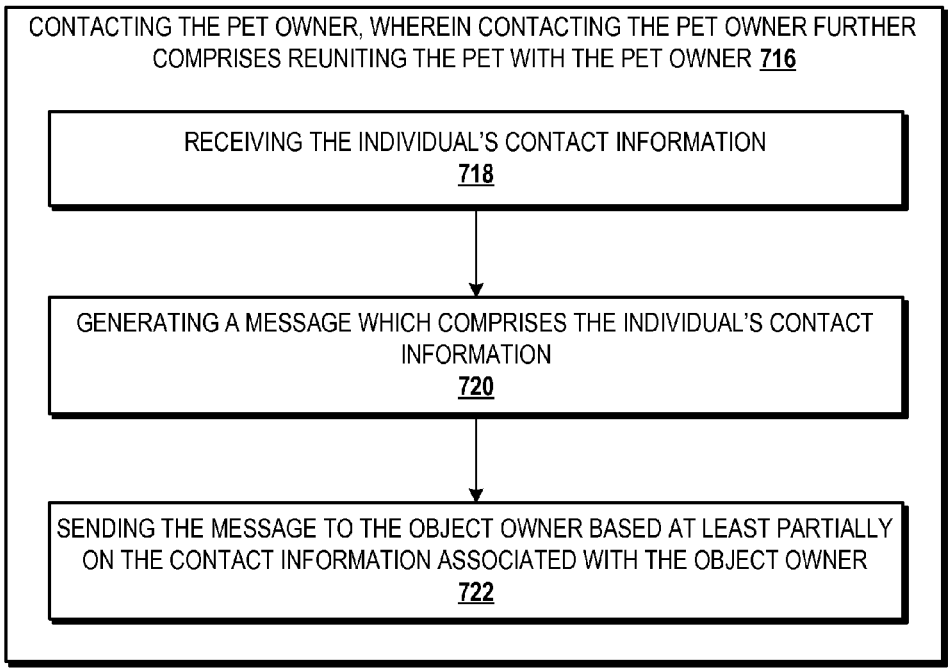
Figure 8:
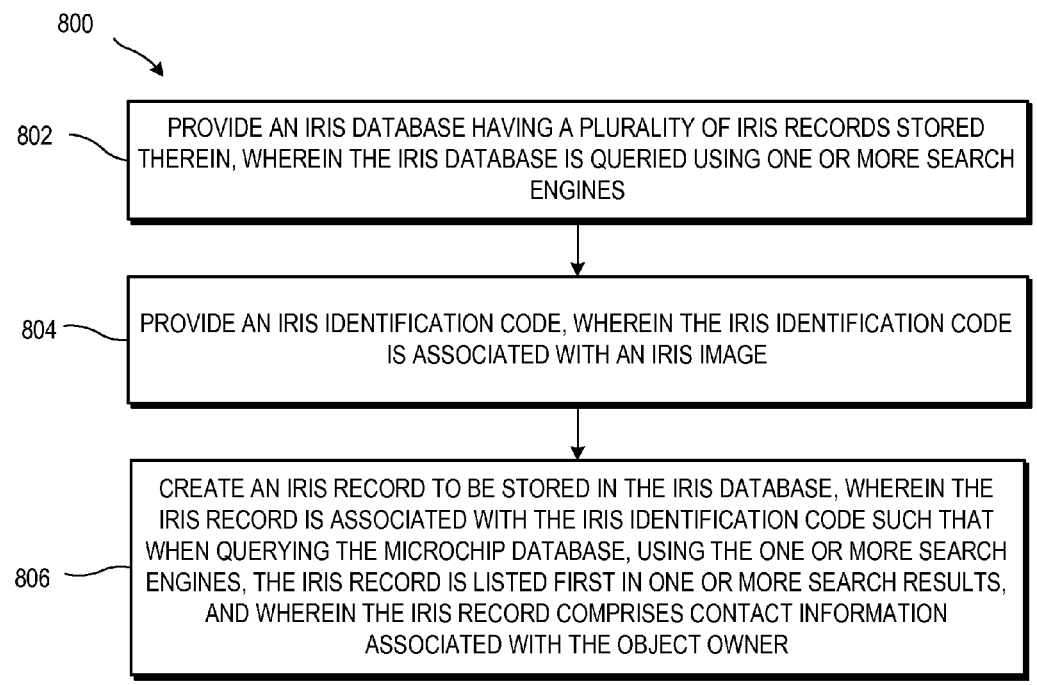
Figure 9:
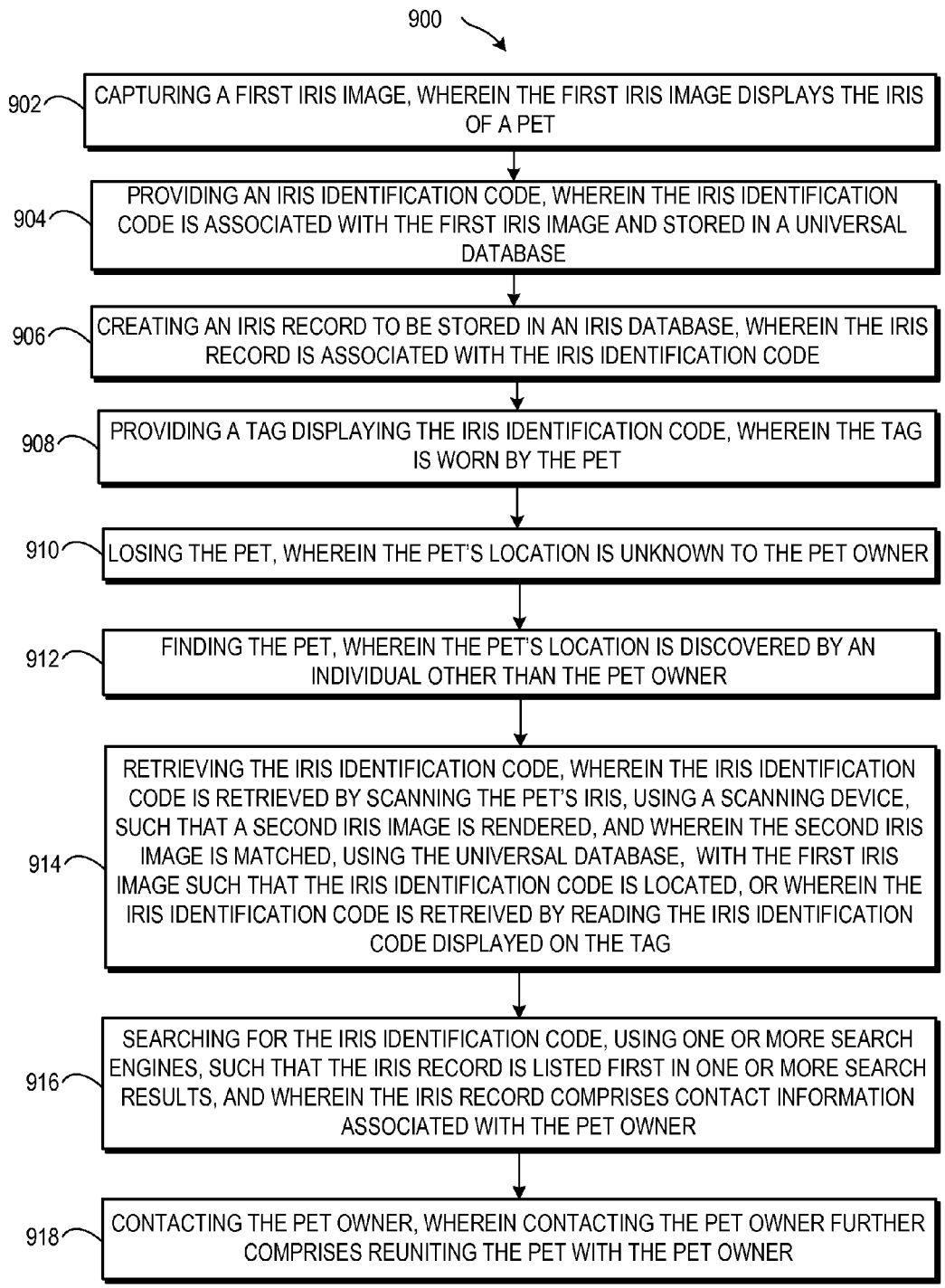
Figure 11:
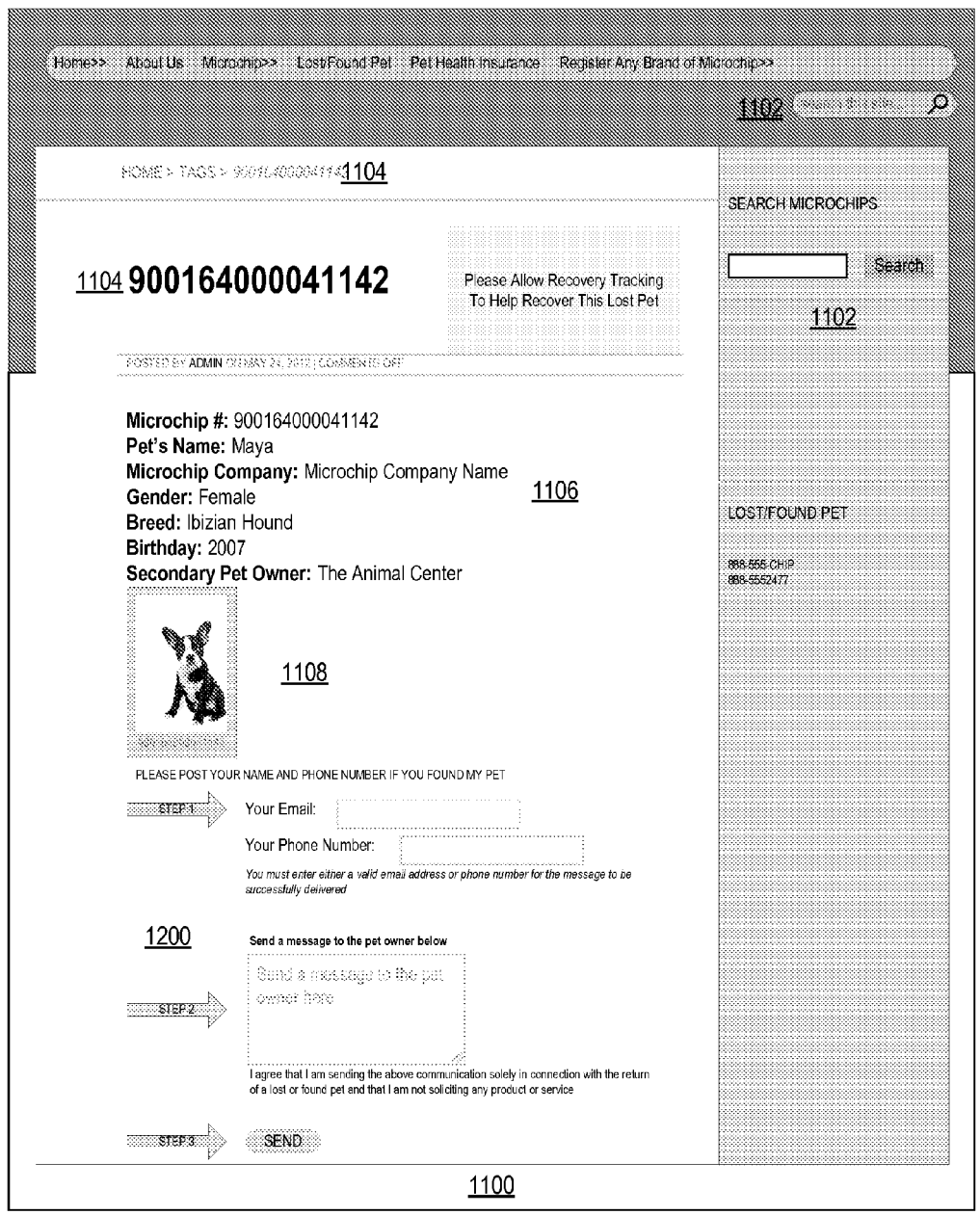

Having thus described embodiments of the invention in general terms, reference will now be made to the accompanying drawings, which are not necessarily drawn to scale, and wherein:

FIG. 1 provides a diagram illustrating a system for locating an object owner, according to an embodiment of the present invention;

FIG. 2 provides a block diagram illustrating the user's computing device of FIG. 1, in accordance with various embodiments of the invention;

FIG. 3 provides a block diagram illustrating the web server of FIG. 1, in accordance with various embodiments of the invention;

FIG. 4 provides a flowchart illustrating a method for locating an object owner, in accordance with various embodiments of the invention;

FIG. 5 provides a flowchart illustrating a method for reuniting a pet with the pet owner, in accordance with an embodiment of the present invention;

FIG. 6 provides a flowchart illustrating a method for locating an object owner, in accordance with various embodiments of the invention;

FIG. 7A provides a flowchart illustrating a method for reuniting a pet with the pet owner, in accordance with an embodiment of the present invention;

FIG. 7B provides a flowchart illustrating a method for contacting a pet owner, in accordance with an embodiment of the present invention;

FIG. 8 provides a flowchart illustrating a method for locating an object owner, in accordance with various embodiments of the invention;

FIG. 9 provides a flowchart illustrating a method for reuniting a pet with the pet owner, in accordance with an embodiment of the present invention;

FIG. 10 provides a screenshot illustrating search results, in accordance with various embodiments of the invention; and FIG. 11 provides a screenshot illustrating a microchip record displayed on a website, in accordance with present embodiments.

Figure 12:
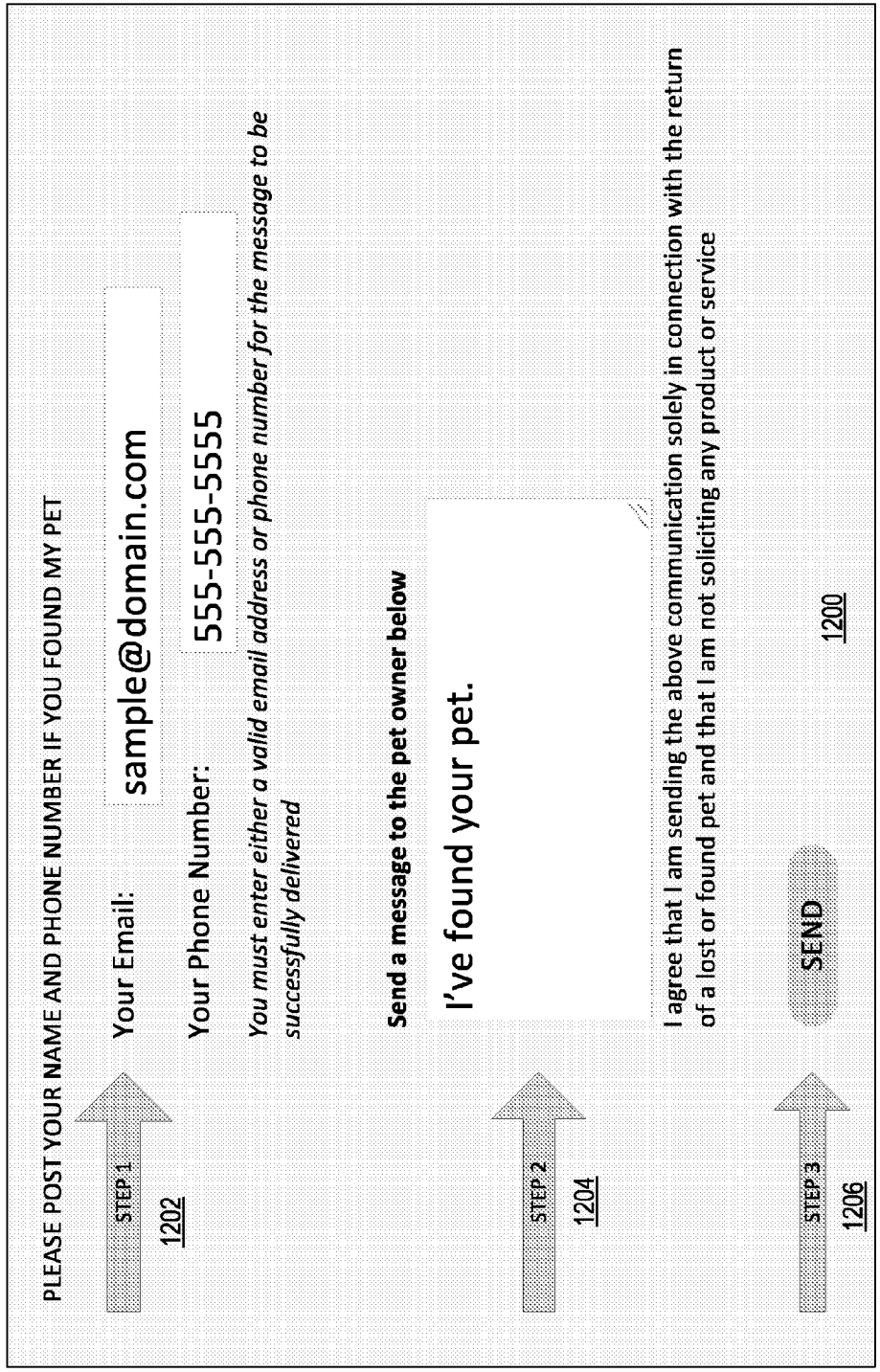

FIG. 12 provides a contact form, in accordance with present embodiments.

Figure 13:
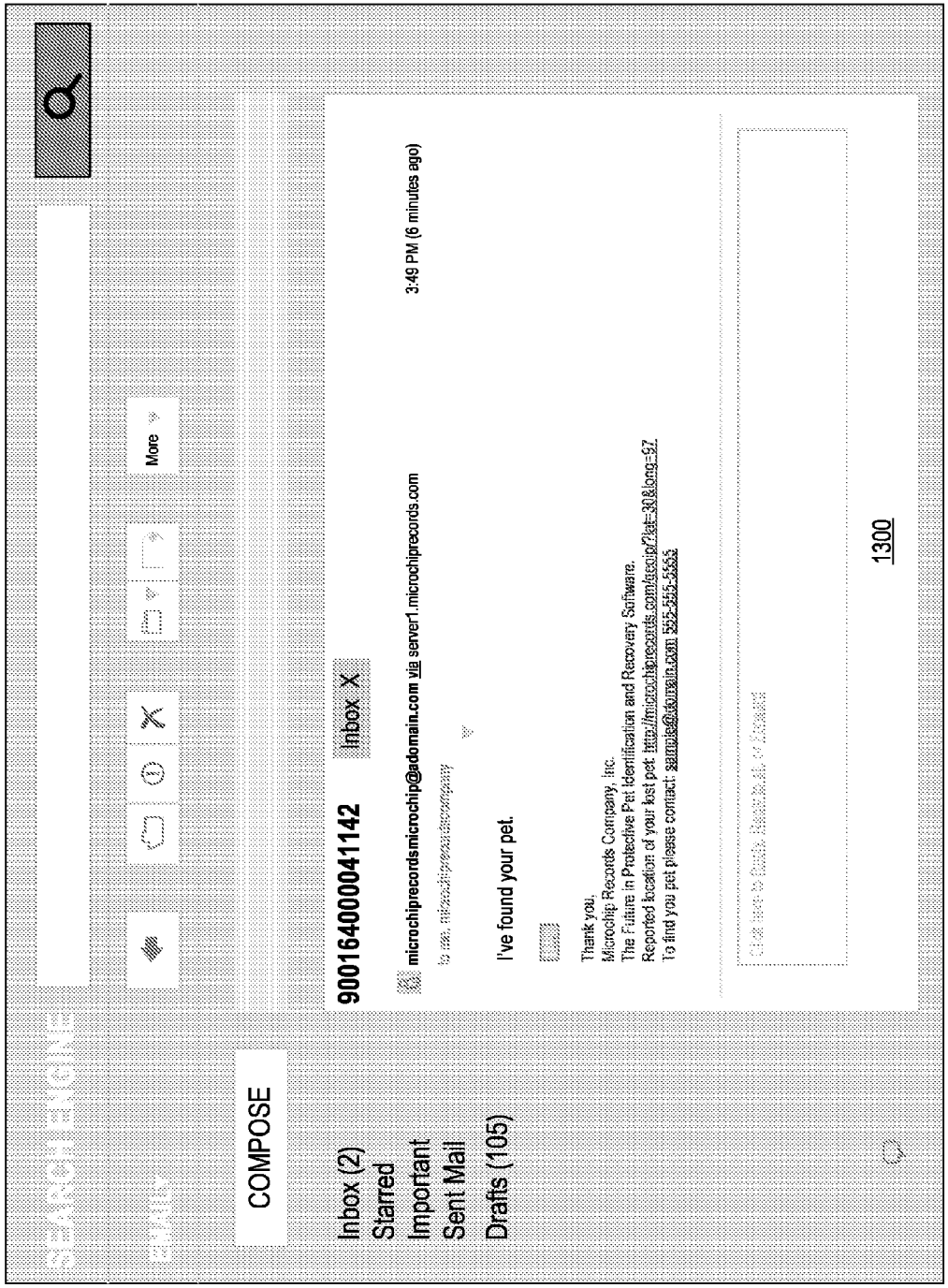

FIG. 13 provides an email notification, in accordance with present embodiments.

Figure 14:
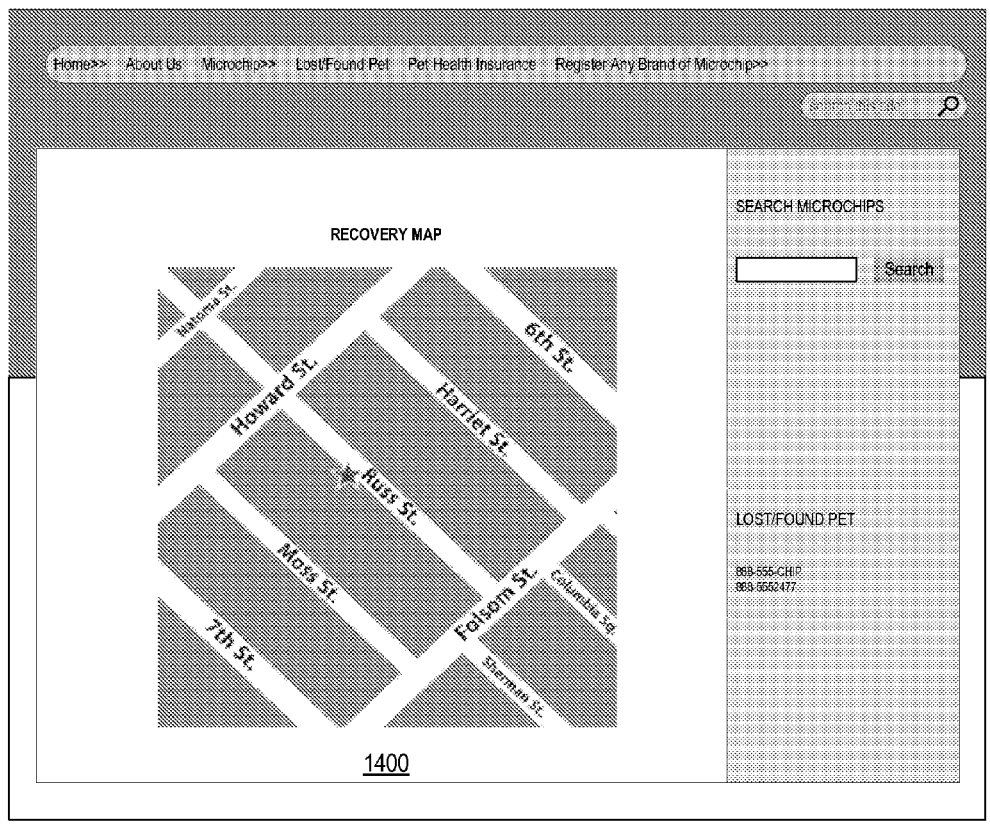

FIG. 14 provides a screenshot illustrating a recovery map, in accordance with present embodiments.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and Blu-Ray disc where disks usually reproduce data magnetically, while discs usually reproduce data optically with lasers. Combinations of the above should also be included within the scope of computer-readable media.

Thus, methods, systems, computer program products and the like are herein disclosed that provide for locating an object owner. Embodiments of the invention provide a means for storing and retrieving microchip information and contact information of the owner of an object for which the microchip has been implanted. Such information may be globally available, through an online web application, for users to search and retrieve via built-in search capabilities as well as one or more other search engines. Inasmuch, this functionality protects objects and provides ease in the process of re-uniting lost objects with their respective owner through the pairing of the microchip information and online web applications.

In an exemplary embodiment, a searchable microchip identification code is searched using one or more search engines to aid in locating a lost object, such as a pet. In response to searching for the microchip identification code, a link to the object owner's information is populated first in a list of search results. In some embodiment, the link directs a user to the microchip record associated with the microchip identification code. The microchip record may be stored in a database, which houses a plurality of microchip records, and displayed via a website. The microchip record may further comprise a means for contacting the object owner in the event that an individual has located a lost object. The object owner's information may remain anonymous during the contact process. Contacting the object owner may result in an email and/or text message being sent to the object owner. The message can comprise information such as the contact information of the individual that has located the lost object and the last known location of the lost object.

Referring to FIG. 1, a diagram is depicted of a system 10 for locating an object owner. The system includes an apparatus 100 that includes a computing platform 102 having at least one processing device 104 and a memory 106. The memory 106 includes an identification database 108 having one or more identification records 110 stored therein. The identification records 110 may include records such as microchip records, iris records, and/or the like. The identification database 108 is configured such that it may be queried using one or more search engines. In one embodiment, the one or more search engines may comprise an online web application having built-in search capabilities for use in the online web application. In an alternative embodiment, the one or more search engines may comprise a general search engine for use in querying the World Wide Web. The identification records 110 may comprise contact information associated with an object owner(s), object name(s), object photo(s), object handling guidelines and the like. For example, in one embodiment the object may be an animal. Inasmuch, in such an embodiment the identification record 110 may comprise useful information about a pet such as the pet's microchip identification code, name, photo, physical appearance and conditions, owner, medical examination information, test information, special food and/or medication information and the like.

The system 10 also includes computing device 200 associated with user 202 and web server 220. The user 202 may be an object owner, business entity, or individual who has located a lost object. In accordance with present invention, the identification database 108 of apparatus 100 may be operable to communicate with the user's computing device 200 and web server 220 through a network connection 250, which may be wired or wireless. In addition, the user's computing device 200 and web server 220 may be operable to communicate with each other through a network connection 250. It should be noted that web server 220 may represent one or more web servers. The identification database 108 is configured such that it may store one or more identification records 110. In one embodiment, identification records 110 may be provided by user 202 via the user's computing device 200 and subsequently stored in the identification database 108. In another embodiment, the identification records 110 may be displayed on a website being hosted on web server 220. It should be noted that while system 10 of FIG. 1 depicts apparatus 100 and computing device 200 as separate entities, according to embodiments herein disclosed, the operations and functions conducted by apparatus 100 and computing device 200 may be included in one single apparatus, such as apparatus 100. The reader is reminded of the assumption previously stated that an apparatus is not limited in form to a single device but rather may comprise multiple devices.

In addition, while FIG. 1 depicts computing device 200 as being a personal computer (PC), the computing device may be any wired or wireless device capable of network communication. The computing device 200 may be any device that employs a processor and memory and can perform computing functions, such as a personal computer or a mobile device. As used herein, a "mobile device" is any mobile communication device, such as a personal digital assistant (PDA), a mobile Internet accessing device, or other mobile device. In one specific embodiment, the computing device 200 may be a handheld computing device, such as a cellular telecommunications device (i.e., a cell phone or mobile phone), which provides for the user to dynamically access the identification database 108, identification records 110, and/or websites at any point in time.

Referring now to FIG. 2, the computing device 200 associated with the user 202 includes various features, such as a network communication interface 210, a user interface 212, a processing device 214, and a memory device 216. The network communication interface 210 includes a device that allows the computing device 200 to communicate over the network 250 (shown in FIG. 1). In addition, a network browsing application 218 is stored in the memory device 216. The network browsing application 218 provides for the user to establish network communication with the apparatus 100 and web server 220 (shown in FIG. 1) for the purpose of storing and retrieving microchip information, in accordance with embodiments of the present invention.

As used herein, a "processing device," such as the processing device 104, the processing device 214, and/or the processing device 232, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing devices 104, 214, and/or 232 may further include functionality to operate one or more software programs based on computer-executable program code thereof, which may be stored in a memory. As the phrase is used herein, a processing device 104, 214, and/or 232 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 212 generally includes one or more interface devices that allow a user 202 to input commands and data to direct the processing device to execute instructions. As such, the user interface 212 employs certain input and output devices to input data received from the user 202 or output data to the user 202. These input and output devices may include a display, mouse, keyboard, button, touchpad, touch screen, microphone, speaker, LED, light, joystick, switch, buzzer, bell, and/or other customer input/output device for communicating with one or more users 202.

As used herein, a "memory" 106, 216 and/or 234 generally refers to a device or combination of devices that store one or more forms of computer-readable media and/or computer-executable program code/instructions. Computer-readable media is defined in greater detail below. For example, in one embodiment, the memory device 106, 216 and/or 234 includes any computer memory that provides an actual or virtual space to temporarily or permanently store data and/or commands provided to the processing device 104, 214, and/or 232 when it carries out its functions described herein.

FIG. 3 provides a block diagram illustrating the web server 220, in accordance with an embodiment of the invention. In one embodiment of the invention, the web server 220 is operated by a second entity that is a different or separate entity from the first entity that, in one embodiment of the invention, implements the apparatus 100. In another embodiment, the web server 220 may be part of the apparatus 100. As illustrated in FIG. 3, the web server 220 generally includes, but is not limited to, a network communication interface 230, a processing device 232, and a memory device 234. The processing device 232 is operatively coupled to the network communication interface 230 and the memory device 234. In one embodiment of the web server 220, the memory device 234 may store, but not be limited to storing, a web server application 236. The web application server may comprise a website 238 having an identification database interface 240 and one or more blogging websites 242. In one embodiment of the invention, both the website 238 having an identification database interface 240 and the plurality of blogging websites 242 may associate with applications having computer-executable program code that instructs the processing device 232 to operate the network communication interface 230 to perform certain communication functions involving the web server application 236 described herein. In one embodiment, the computer-executable program code of an application associated with the web server application 236 may also instruct the processing device 232 to perform certain logic, data processing, and data storing functions of the application associated with the web server application 236 described herein.

The network communication interface 230 is a communication interface having one or more communication devices configured to communicate with the one or more other devices on the network 250. The processing device 232 is configured to use the network communication interface 230 to receive information from and/or provide information and commands to the user's computing device 200, the apparatus 100 and/or other devices via the network 250. In some embodiments, the processing device 232 also uses the network communication interface 230 to access other devices on the network 250, such as one or more additional web servers of one or more third-party data providers. In some embodiments, one or more the devices described herein may be operated by a second entity so that the third-party controls the various functions involving the web server application 236. For example, in one embodiment of the invention, although the apparatus 100 is operated by a first entity, a second entity operates the web server 220 that stores the website and blog websites 242 used for displaying microchip records.

Now referring to FIG. 4, a flowchart illustrating a method for locating an object owner is provided. One or more devices, such as one or more mobile device and/or one or more other computing devices and/or servers, can be configured to perform one or more steps of the method 400. In some embodiments, the one or more devices performing the steps are associated with a manufacturer. In other embodiments, the one or more devices performing the steps are associated with an owner, business, third party, and/or user.

At event 402, an identification database 108 is provided. The identification database 108 may be configured such that it stores multiple identification records 110. The identification database 108 may also be queried using one or more search engines. In one embodiment, the one or more search engines may comprise an online web application having built-in search capabilities for use in the online web application. In an alternative embodiment, the plurality of search engines may comprise general search engines for use in querying the World Wide Web.

In one embodiment, the identification database 108 may have both administrative and general access rights. In such an embodiment, the administrative rights may include, but not be limited to, the rights to add, edit, and delete identification records 110. In one example, an object may be destroyed in which the object owner may request for the identification record 110 to be removed from the identification database 108. In another example, the object owner may obtain new contact information and request that the identification record 110 be updated in the identification database 108 to reflect the new contact information. Additionally, in such an embodiment, general access rights may be limited to viewing access for the identification records 110. For example, a member of the general public may have access to the identification database 108 for the purpose of searching, retrieving, and viewing identification records 110, but may not have access to add, edit, and/or delete identification records 110 from the identification database 108. This feature ensures the security and accuracy of data stored within the identification database 108.

In one embodiment, the identification database 108 may be password protected such that only a user 202 with accurate password credentials may be granted administrative rights to the identification database 108. In another embodiment, the individual identification record 110 may be password protected such that a user 202 with accurate password credentials may be granted administrative rights to the individual identification records 110. In such an embodiment, the user 202 may edit and/or delete the individual identification record 110 but may not alter other identification records 110 within the identification database 108 for which they do not have access.

At event 404, an identifier having an identification parameter is provided. The identifier may be a microchip, biometric parameter (e.g. iris image, finger print, DNA, etc.), an object image and/or the like. In one embodiment, the identification parameter may be an alphanumeric code associated with the identifier. In another embodiment, the identification parameter may be a sequential number code. In yet another embodiment, the identification parameter may be a barcode. In further embodiments, the identification parameter may be a QR code. The identification parameter may vary in length and/or structure.

The identifier may be associated with any object. In one embodiment, the identifier may be implanted into any object. As such, the method of implantation may vary depending upon the object to which the identifier is being implanted. For example, in one embodiment, the object may be an animal. Inasmuch, the identifier may be implanted subcutaneously between the animal's shoulder blades. In another embodiment, the object may be a cellular device. As such, implantation may comprise embedding the identifier within the casing or circuitry of the cellular device. In one embodiment, the identifier may be a 2 mm radio frequency identification device (hereinafter, "R.F.I.D."). In a specific embodiment, the R.F.I.D. may be a bio thermal glass encapsulated device. In one embodiment, after implantation of the identifier, the identifier may be active for a lifetime. In an alternative embodiment, after implantation of the identifier, the identifier may be active for a predetermined period of time. In such an embodiment, the predetermined period of time may be determined by an identifier manufacturer, identifier owner, business entity and the like.

In one embodiment, the identifier emits a unique signal when scanned by a scanning device such that the identification parameter is displayed on the scanning device. In such an embodiment, the identifier may function as an antenna that emits a signal when scanned. In another embodiment, the identifier may function as a storage device void of a power source such that it stores the identification parameter and emits a low radio frequency when prompted by a scanning device. In one embodiment, the response may be the identification parameter. It should be noted that the terms response and signal may be used interchangeably throughout the specification. As such the response may be delivered to the scanning device such that it is displayed on a screen of the scanning device. The response may be displayed in a variety of form depending on the structure of the identification parameter. In one embodiment, an alphanumeric code may be displayed on the screen of the scanning device. In another embodiment, a sequential number code may be displayed on the screen of the scanning device. In yet another embodiment, a barcode may be displayed on the screen of the scanning device. In further embodiments, a Quick Response (QR) code may be displayed on the screen of the scanning device. The responses may vary in length and/or structure. The identification may be configured such that it emits a signal when scanned by any universal scanning device.

In one embodiment, an object tag may be provided such that the identification parameter is displayed on the object tag. The object tag may be attached to the object using various methods. In one embodiment, the object tag may be attached to the object using a chain. In another embodiment, the object tag may be welded to the object. The object tag may display useful information such that the information is engraved in the object tag. In one embodiment, the object tag may display information such as contact information associated with an object owner(s), object name(s), object photo(s), object handling guidelines and the like. The object tag may display any information indicated in the identification record 110. The object tag may display a website, search engine and/or contact information associated with reporting a lost or found object. In one embodiment, the object tag may be an aluminum tag. In such an embodiment, the object tag may be rust resistant.

At event 406, an identification record 110 is created and stored in the identification database 108. In one embodiment, the identification record 110 may comprise contact information associated with an object owner(s), object name(s), object photo(s), object handling guidelines and the like. In one embodiment, a user interface 212 may be provided such that a user 202 is able to enter information to be associated with the identification record 110. In another embodiment the user may add, edit, delete and/or view identification records via the user interface 212. In one embodiment, the user 202 is able to enter information to be associated with the identification record 110 using form(s) to store the information into the identification database 108. In such an embodiment, the form may gather useful information pertaining to the object.

In another embodiment, a website associated with the identification database 108 may be created such that the identification records 110 are posted and/or displayed on the website. In one embodiment, posting an identification record 110 on the website may subsequently result in the identification record being stored in the identification database 108. In another embodiment, deleting an identification record 110 on the website may subsequently result in the identification record being deleted in the identification database 108. In yet another embodiment, editing an identification record 110 on the website may subsequently result in the identification record being altered in the identification database 108. Inasmuch, the website may function as a user interface for adding, editing, and/or deleting identification records 110 in the identification database 108. In another embodiment, the website may only function as a user interface for searching, retrieving, and viewing identification records 110 stored within the identification database 108. In one embodiment, the website may have built-in search capabilities such that a user may search, retrieve, and view identification records 110 stored within the identification database 108 without the use of an external search engine.

The identification record 110 may also be repeatedly posted on one or more blog websites 242 such that the blogging site contains a link to a website page displaying the identifier information 1100, as shown in FIG. 11. In one embodiment, the identification record 110 may be continuously posted to the blogging site for a predetermined amount of time. For example, the identification record may be continuously posted to one or more blog websites 242 repeatedly for a 24 hour period. In one embodiment, the identification record 110 may be posted to the blogging site every second for a 24 hour period. Inasmuch, the repetitive posting of identification records may attract multiple search bots to the blog websites 242, and subsequently to the website where the identification record 110 is displayed.

The identification record 110 may also comprise the identification parameter such that when querying the identification database 108 the identification parameter may be used as the search term. In another embodiment, other information associated with the identification record 110 may be used as a search term such that an identification record 110 may be retrieved using any information listed in the identification record 110. The identification database 108 may be queried using one or more search engines such that a link to the identification record 110, being displayed on a website, is listed first in one or more search results. In one embodiment, the identification database 108 may be queried using one or more search engines such that a link 1004 to the identification record 110, being displayed on a website, is listed as the only result in the search results 1000, as shown in FIG. 10.

Now referring to FIG. 5, a flowchart illustrating a method for reuniting a pet with the pet owner 500, in accordance with an embodiment of the present invention, is depicted. At event 502, an identifier having an identification code may be provided. The identification may be associated with the pet such that the form of identification is active for the lifetime of the pet.

At event 704, an identification record 110 is created and stored in the identification database 108. In one embodiment, a user interface 212 may be provided such that a user 202 is able to enter information to be associated with the identification record. In one embodiment, the user 202 may be the owner of the pet. In another embodiment, the user 202 may be a veterinarian. In yet another embodiment, the user 202 may be an employee of the identification company. In one embodiment the user may add, edit, delete and/or view identification records 110 via the user interface 212. In another embodiment, the user 202 is able to enter information to be associated with the identification record 110 using form(s) to store the information into the identification database 108. In such an embodiment, the form may gather useful information pertaining to the pet.

At event 506, a tag displaying the identification code is provided. The tag may be worn by the pet. The tag may be attached to the pet using various methods. For example, in an instance where the pet may be a dog the tag may be attached to a dog collar and worn by the dog via the dog collar. The tag may display any information indicated in the identification record 110. The tag may display a website, search engine, and/or contact information associated with reporting a lost and/or found pet. In one embodiment, the tag may be comprised of aluminum, plastic, or other rust resistant materials.

At event 508, a pet is lost such that the pet's location may be unknown to the pet owner. At event 510, the pet is found such that the pet's location may be discovered by an individual other than pet owner. At event 512, the identification code may be retrieved. In one embodiment, the identification code may be retrieved by reading the identification code from the tag that is being worn by the pet.

At event 514, the user 202 searches the identification database 108 using one or more search engines. The user 202 may be an individual who has located a lost pet. Searching the identification database 108 may comprise using the identification code retrieved from the pet as a search term in the one or more search engines, such that the identification record 110 is listed first in one or more search results. In one embodiment, the one or more search results may comprise the contact information associated with the pet owner. Inasmuch, at event 716, the individual who has located the lost pet may contact the pet owner using the contact information provided in the one or more search results such that the pet may be reunited with the pet owner.

Now referring to FIG. 6, a flowchart illustrating a method for locating an object owner is provided. One or more devices, such as one or more mobile device and/or one or more other computing devices and/or servers, can be configured to perform one or more steps of the method 600. In some embodiments, the one or more devices performing the steps are associated with a microchip manufacturer. In other embodiments, the one or more devices performing the steps are associated with an owner, business, third party, and/or user.

In some embodiments, the identification database 108 is a microchip database, which stores a plurality of identification records 110, including, but not limited to microchip records. At event 602, a microchip database is provided. The microchip database may be configured such that it stores multiple microchip records. The microchip database may also be queried using one or more search engines. In one embodiment, the one or more search engines may comprise an online web application having built-in search capabilities for use in the online web application. In an alternative embodiment, the plurality of search engines may comprise general search engines for use in querying the World Wide Web.

In one embodiment, the microchip database may have both administrative and general access rights. In such an embodiment, the administrative rights may include, but not be limited to, the rights to add, edit, and delete microchip records. In one example, an object may be destroyed in which the object owner may request for the microchip record to be removed from the microchip database. In another example, the object owner may obtain new contact information and request that the microchip record be updated in the microchip database to reflect the new contact information. Additionally, in such an embodiment, general access rights may be limited to viewing access for the microchip records. For example, a member of the general public may have access to the microchip database for the purpose of searching, retrieving, and viewing microchip records, but may not have access to add, edit, and/or delete microchip records from the microchip database. This feature ensures the security and accuracy of data stored within the microchip database.

In one embodiment, the microchip database may be password protected such that only a user 202 with accurate password credentials may be granted administrative rights to the microchip database. In another embodiment, the individual microchip records may be password protected such that a user 202 with accurate password credentials may be granted administrative rights to the individual microchip records. In such an embodiment, the user 202 may edit and/or delete the individual microchip record but may not alter other microchip records within the microchip database for which they do not have access.

At event 604, a microchip having a microchip identification code is provided. In one embodiment, the microchip identification code may be an alphanumeric code associated with the microchip. In another embodiment, the microchip identification code may be a sequential number code. In yet another embodiment, the microchip identification code may be a barcode. In further embodiments, the microchip identification code may be a Quick Response code. The microchip identification codes may vary in length and/or structure.

The microchip may be implanted into any object. As such, the method of implantation may vary depending upon the object to which the microchip is being implanted. For example, in one embodiment, the object may be an animal. Inasmuch, the microchip may be implanted subcutaneously in the animal. In another embodiment, the object may be a cellular device. As such, implantation may comprise embedding the microchip within the casing or circuitry of the cellular device. In one embodiment, the microchip may be a 2 mm R.F.I.D. In a specific embodiment, the R.F.I.D. may be a bio thermal glass encapsulated device. In one embodiment, after implantation of the microchip, the microchip may be active for a lifetime. In an alternative embodiment, after implantation of the microchip, the microchip may be active for a predetermined period of time. In such an embodiment, the predetermined period of time may be determined by a microchip manufacture, microchip owner, business entity and the like.

In one embodiment, the microchip emits a unique signal when scanned by a scanning device such that the microchip identification code is displayed on the scanning device. In such an embodiment, the microchip may function as an antenna that emits a signal when scanned. In another embodiment, the microchip may function as a storage device void of a power source such that it stores the microchip identification code and emits a low radio frequency when prompted by a scanning device. In one embodiment, the response may be the microchip identification code. It should be noted that the terms response and signal may be used interchangeably throughout the specification. As such the response may be delivered to the scanning device such that it is displayed on a screen of the scanning device. The response may be displayed in a variety of form depending on the structure of the microchip identification code. In one embodiment, an alphanumeric code may be displayed on the screen of the scanning device. In another embodiment, a sequential number code may be displayed on the screen of the scanning device. In yet another embodiment, a barcode may be displayed on the screen of the scanning device. In further embodiments, a QR code may be displayed on the screen of the scanning device. The responses may vary in length and/or structure. The microchip may be configured such that it emits a signal when scanned by any universal scanning device.

In one embodiment, an object tag may be provided such that the microchip identification code is displayed on the object tag. The object tag may be attached to the object using various methods. In one embodiment, the object tag may be attached to the object using a chain. In another embodiment, the object tag may be welded to the object. The object tag may display useful information such that the information is engraved in the object tag. In one embodiment, the object tag may display information such as contact information associated with an object owner(s), object name(s), object photo(s), object handling guidelines and the like. The object tag may display any information indicated in the microchip record. The object tag may display a website, search engine and/or contact information associated with reporting a lost or found object. In one embodiment, the object tag may be an aluminum tag. In such an embodiment, the object tag may be rust resistant.

At event 606, a microchip record is created and stored in the microchip database. In one embodiment, the microchip record may comprise contact information associated with an object owner(s), object name(s), object photo(s), object handling guidelines and the like. In one embodiment, a user interface 212 may be provided such that a user 202 is able to enter information to be associated with the microchip record. In another embodiment the user may add, edit, delete and/or view microchip records via the user interface 212. In one embodiment, the user 202 is able to enter information to be associated with the microchip record using form(s) to store the information into the microchip database. In such an embodiment, the form may gather useful information pertaining to the object.

In another embodiment, a website associated with the microchip database may be created such that the microchip records are posted and/or displayed on the website. In one embodiment, posting a microchip record on the website may subsequently result in the microchip record being stored in the microchip database. In another embodiment, deleting a microchip record on the website may subsequently result in the microchip record being deleted in the microchip database. In yet another embodiment, editing a microchip record on the website may subsequently result in the microchip record being altered in the microchip database. Inasmuch, the website may function as a user interface for adding, editing, and/or deleting microchip records in the microchip database. In another embodiment, the website may only function as a user interface for searching, retrieving, and viewing microchip records stored within the microchip database. In one embodiment, the website may have built-in search capabilities such that a user may search, retrieve, and view microchip records stored within the microchip database without the use of an external search engine.

The microchip record may also be repeatedly posted on one or more blog websites 242 such that the blogging site contains a link to a website page displaying the microchip information 1100, as shown in FIG. 1. In one embodiment, the microchip record may be continuously posted to the blogging site for a predetermined amount of time. For example, the microchip record may be continuously posted to one or more blog websites 242 repeatedly for a 24 hour period. In one embodiment, the microchip record may be posted to the blogging site every second for a 24 hour period. Inasmuch, the repetitive posting of microchip records may attract multiple search bots to the blog websites 242, and subsequently to the website where the microchip record is displayed.

The microchip record may also comprise the microchip identification code such that when querying the microchip database the microchip identification code may be used as the search term. In another embodiment, other information associated with the microchip record may be used as a search term such that a microchip record may be retrieved using any information listed in the microchip record. The microchip database may be queried using one or more search engines such that a link to the microchip record, being displayed on a website, is listed first in one or more search results. In one embodiment, the microchip database may be queried using one or more search engines such that a link 1004 to the microchip record, being displayed on a website, is listed as the only result in the search results 1000, as shown in FIG. 10.

Now referring to FIG. 7A, a flowchart illustrating a method for reuniting a pet with the pet owner 700, in accordance with an embodiment of the present invention, is depicted. At event 702, a microchip having a microchip identification code may be provided. The microchip may be implanted in the pet such that the microchip may be active for the lifetime of the pet. In one embodiment, the microchip may be implanted subcutaneously between the pet's shoulder blades. In another embodiment, the microchip may be implanted subcutaneously in another area of the pet's anatomy.

At event 704, a microchip record is created and stored in the microchip database. In one embodiment, the microchip record may comprise contact information associated with the pet owner(s), name(s), photo(s), physical appearance (e.g. color, markings, breed and the like), medical examination information, test information, special food information, medication information and the like. In one embodiment, a user interface 212 may be provided such that a user 202 is able to enter information to be associated with the microchip record. In one embodiment, the user 202 may be the owner of the pet. In another embodiment, the user 202 may be a veterinarian. In yet another embodiment, the user 202 may be an employee of the microchip company. In one embodiment the user may add, edit, delete and/or view microchip records via the user interface 212. In another embodiment, the user 202 is able to enter information to be associated with the microchip record using form(s) to store the information into the microchip database. In such an embodiment, the form may gather useful information pertaining to the pet.

At event 706, a tag displaying the microchip identification code is provided. The tag may be worn by the pet. The tag may be attached to the pet using various methods. For example, in an instance where the pet may be a dog the tag may be attached to a dog collar and worn by the dog via the dog collar.

The tag may display any information indicated in the microchip record. The tag may display a website, search engine, and/or contact information associated with reporting a lost and/or found pet. In one embodiment, the tag may be comprised of aluminum, plastic, or other rust resistant materials.

At event 708, a pet is lost such that the pet's location may be unknown to the pet owner. At event 710, the pet is found such that the pet's location may be discovered by an individual other than pet owner. At event 712, the microchip identification code may be retrieved. In one embodiment, the microchip identification code may be retrieved by scanning the pet. In such an embodiment, the microchip emits a unique signal when scanned by a scanning device such that the microchip identification code may be displayed on the scanning device. In an alternative embodiment, the microchip identification code may be retrieved by reading the microchip identification code from the tag that is being worn by the pet.

At event 714, the user 202 searches the microchip database using one or more search engines. The user 202 may be an individual who has located a lost pet. Searching the microchip database may comprise using the microchip identification code retrieved from the pet as a search term in the one or more search engines, such that the microchip record is listed first in one or more search results. In one embodiment, the one or more search results may comprise the contact information associated with the pet owner. Inasmuch, at event 716, the individual who has located the lost pet may contact the pet owner using the contact information provided in the one or more search results such that the pet may be reunited with the pet owner.

As illustrated in FIG. 7B, contacting the pet owner in an effort to reunite the pet with the pet owner, at event 716, may comprise several steps, including but not limited to, receiving the contact information of the individual who has located the lost pet, generating a message which comprises the individual's contact information, and sending the message to the pet owner.

At event 718, contact information is received from an individual that has located the lost pet. The contact information may include information such as the individual's email address, phone number, name, and the like 1202. The individual may additionally provide a customized message to be sent to the object owner 1204. In the embodiment illustrated in FIG. 11 and FIG. 12, the contact information may be received via a contact form that is associated with the microchip record and displayed on a website 1100. The contact form may also specify terms of agreements for contacting the pet owner. For example, the contact form may state "I agree that I am sending the above communication solely in connection with the return of a lost or found pet and that I am not soliciting any product of service". The contact form may additionally comprise a "send" button for initiating contact with a pet owner 1206. In some embodiments, the contact information is not successfully received until the information has been verified. For example, system may verify that the email address and phone number received are valid. In an instance that the system determines the contact information is invalid an error message may be generated which prompts the individual to enter valid contact information. In some embodiments, receiving contacting information from an individual may comprise receiving a voice message from the individual which contains their contact information.

At event 720, upon receiving the contact information of the individual who has located the lost pet, the system may generate a message which includes the contact information received from the individual as well as any additional information that has been provided by the individual. The message may include information such as the individual's email address, phone number, name, a customized message, the last known location of the pet and the like. In some embodiments, the last known location of the pet may be provided using IP-based technology, GPS, and the like. For example, the system may indicate that the last known location of the lost pet is the location associated with the Internet Protocol (IP) Address of the device (e.g. mobile device, computer, etc.) used to initiate contact with the object owner, where initiating contact may comprise providing contact information via a website to be sent to the object owner. The last known location of the pet may additionally be manually specified by the individual who has located the lost pet. For example, the individual may provide an address and/or longitude/latitude coordinates which indicate the last known location of the pet.

At event 722, the message is sent to the pet owner based at least partially on the contact information associated with the pet owner. The message may be sent to the pet owner through at least one means for contacting the owner, previously specified by the owner, and associated with the microchip record. In some embodiments, pet owners are privately contacted such that their contact information remains anonymous to the individual contacting the pet owner. For example, as illustrated in FIG. 12, the individual contacting the pet owner is unable to see the pet owner's contact information. The contact information may be stored in a database such that the message can be sent using the system as a third party for contacting the pet owner. To this extent, the individual does not have to directly contact the pet owner using their personal email or phone number. The message may be sent to the pet owner via email, text message, multimedia message, short message service (SMS), and/or any combination of the aforementioned. In one embodiment, a voice message containing an individual's contact information is sent the pet owner's emails and/or mobile device. Multiple messages may be simultaneously sent to the pet owner. For example, an email message and text message may be simultaneously sent to the pet owner. In an instance where a contact form is used to contact a pet owner, the message may be sent in response to the user selecting the option to "send" the message. In some embodiments, the message may not be sent until the individual has agreed to one or more terms and conditions for contacting the pet owner. In some embodiments, the message may not be sent until the system has verified the contact information received from the individual. For example, a message may be displayed which states "You must enter either a valid email address or phone number for the message to be delivered successfully". The message may be additionally sent to an inbox associated with the website and/or database which displays or stores the plurality of microchip records.

As illustrated in FIG. 13, in response to sending the message a pet owner may receive an email 1300 which specifies their lost pet has been found. The email 1300 may additionally indicate the contact information of the individual that has located the lost pet. In some embodiments, the message further comprises a link to the last known location of the pet. In such an embodiment, upon selecting the link, a map may be generated which indicates the last known location of the pet. As illustrated in FIG. 14, the recovery map 1400 may be generated on a page associated with the website and/or database that displays or stores the plurality of microchip records. In an alternative embodiment, the recovery map 1400 may be sent to the owner via text message or directly displayed within the body of the email. The pet owner may use the recovery map 1400 to track their location relative to the last known location of the pet and/or receive directions to the last known location of the pet. In some embodiments, the link may generate a satellite view of the last known location of the pet.

Now referring to FIG. 8, a flowchart illustrating a method for locating an object owner is provided. One or more devices, such as one or more mobile device and/or one or more other computing devices and/or servers, can be configured to perform one or more steps of the method 800. In some embodiments, the one or more devices performing the steps are associated with a biometric manufacturer. In other embodiments, the one or more devices performing the steps are associated with an owner, business, third party, and/or user.

In some embodiments, the identification database 108 is an iris database, which stores a plurality of identification records 110, including, but not limited to iris records. At event 802, an iris database is provided. The iris database may be configured such that it stores multiple iris records. The iris database may also be queried using one or more search engines. In one embodiment, the one or more search engines may comprise an online web application having built-in search capabilities for use in the online web application. In an alternative embodiment, the plurality of search engines may comprise general search engines for use in querying the World Wide Web.

In one embodiment, the iris database may have both administrative and general access rights. In such an embodiment, the administrative rights may include, but not be limited to, the rights to add, edit, and delete iris records. In one example, an object may be destroyed in which the object owner may request for the iris record to be removed from the iris database. In another example, the object owner may obtain new contact information and request that the iris record be updated in the iris database to reflect the new contact information. Additionally, in such an embodiment, general access rights may be limited to viewing access for the iris records. For example, a member of the general public may have access to the iris database for the purpose of searching, retrieving, and viewing iris records, but may not have access to add, edit, and/or delete iris records from the iris database. This feature ensures the security and accuracy of data stored within the iris database.

In one embodiment, the iris database may be password protected such that only a user 202 with accurate password credentials may be granted administrative rights to the iris database. In another embodiment, the individual iris records may be password protected such that a user 202 with accurate password credentials may be granted administrative rights to the individual iris records. In such an embodiment, the user 202 may edit and/or delete the individual iris record but may not alter other iris records within the iris database for which they do not have access.

At event 804, an iris identification code is provided. A captured iris image may be converted in the iris identification code. In one embodiment, the iris identification code may be an alphanumeric code associated with an iris image. In another embodiment, the iris identification code may be a sequential number code. In yet another embodiment, the iris identification code may be a barcode. In further embodiments, the iris identification code may be a QR code. The iris identification code may vary in length and/or structure.

An iris image may be captured for any organism with an iris. As such, the iris image may be captured using an iris camera. It should be noted that the iris camera may also be referred to as an iris scanner. The iris scanner may capture an iris image from a plurality of distances depending upon the scanner capabilities. The iris scanner may also be capable of capturing multiple iris images in a small amount of time. In one embodiment, the object may be an animal. Inasmuch, the iris scanner may capture an iris image from the animal. In some embodiments, the iris scan may be captured from 10 inches away. In some embodiments, the iris scan may be captured from more than 10 inches. This feature is advantageous as it protects the individual interacting with the animal. For example, in one embodiment, an animal may be in a vicious mode such that an individual cannot get close enough to the animal to capture an image of its iris. In another embodiment, the object may be a plurality of people. In such an embodiment the iris scanner may be capable of capturing up to 50 iris images per minute. In another embodiment, the captured iris image may be sent to a computing device and converted into an iris identification code. In one embodiment, the computing device may be an online website configured to convert iris images into iris identification codes. In one embodiment, the iris image may be sent to the computing device directly from the iris scanner. In another embodiment, the iris image may be sent to the computing device via facsimile. In yet another embodiment, the iris image may be sent to the computing device via SMS messaging. In another embodiment, the iris image may be sent to the computing device via email.

At event 806, an iris record is created and stored in the iris database. In one embodiment, the iris record may comprise contact information associated with an organism's owner(s), organism name(s), organism photo(s), organism handling guidelines and the like. In one embodiment, a user interface 212 may be provided such that a user 202 is able to enter information to be associated with the iris record. In another embodiment the user may add, edit, delete and/or view iris records via the user interface 212. In one embodiment, the user 202 is able to enter information to be associated with the iris record using form(s) to store the information into the iris database. In such an embodiment, the form may gather useful information pertaining to the object.

In another embodiment, a website associated with the iris database may be created such that the iris records are posted and/or displayed on the website. In one embodiment, posting an iris record on the website may subsequently result in the iris record being stored in the iris database. In another embodiment, deleting an iris record on the website may subsequently result in the iris record being deleted in the iris database. In yet another embodiment, editing an iris record on the website may subsequently result in the iris record being altered in the iris database. Inasmuch, the website may function as a user interface for adding, editing, and/or deleting iris records in the iris database. In another embodiment, the website may only function as a user interface for searching, retrieving, and viewing iris records stored within the iris database. In one embodiment, the website may have built-in search capabilities such that a user may search, retrieve, and view iris records stored within the iris database without the use of an external search engine.

The iris record may also be repeatedly posted on one or more blog websites 242 such that the blogging site contains a link to a website page 1100 displaying the iris identification information, as shown in FIG. 11. In one embodiment, the iris record may be continuously posted to the blogging site for a predetermined amount of time. For example, the iris record may be continuously posted to one or more blog websites 242 repeatedly for a 24 hour period. In one embodiment, the iris record may be posted to the blogging site every second for a 24 hour period. Inasmuch, the repetitive posting of iris records may attract multiple search bots to the blog websites 242, and subsequently to the website where the iris record is displayed.

The iris record may also comprise the iris identification code such that when querying the iris database the iris identification code may be used as the search term. In another embodiment, other information associated with the iris record may be used as a search term such that an iris record may be retrieved using any information listed in the iris record. The iris database may be queried using one or more search engines such that a link to the iris record, being displayed on a website, is listed first in one or more search results. In one embodiment, the iris database may be queried using one or more search engines such that a link 1004 to the iris record, being displayed on a website, is listed as the only result in the search results 1000, as shown in FIG. 10.

Now referring to FIG. 9, a flowchart illustrating a method 900 for reuniting a pet with the pet owner, in accordance with an embodiment of the present invention, is depicted. At event 902, a first iris image is captured. The iris image may be captured using an iris scanner. In one embodiment, the iris scanner may be a mobile phone. In one embodiment, the mobile phone may capture a high-quality image such that the image may be converted to an iris image equivalent to a scanned iris. The iris image may display the pet's iris. At event 904, an iris identification code is provided such that the iris identification code may be associated with the first iris image. Inasmuch, both the iris identification code and the first iris image may be stored in a universal iris database that contains a plurality of iris images and iris identification codes.

At event 906, an iris record is created and stored in the iris database. In one embodiment, the iris record may comprise contact information associated with the pet owner(s), name(s), photo(s), physical appearance (e.g. color, markings, and the like), medical examination information, test information, special food information, medication information and the like. In one embodiment, a user interface 212 may be provided such that a user 202 is able to enter information to be associated with the iris record. In one embodiment, the user 202 may be the owner of the pet. In another embodiment, the user 202 may be a veterinarian. In one embodiment the user 202 may add, edit, delete and/or view iris records via the user interface 212. In another embodiment, the user 202 is able to enter information to be associated with the iris record using form(s) to store the information into the iris database. In such an embodiment, the form may gather useful information pertaining to the pet.

At event 908, a tag displaying the iris identification code is provided. In some embodiments, the tag may be worn by the pet. The tag may be attached to the pet using various methods. For example, in an instance where the pet may be a dog the tag may be attached to a dog collar and worn by the dog via the dog collar. The tag may display any information indicated in the iris record. The tag may display a website, search engine and/or contact information associated with reporting a lost and/or found pet. In one embodiment, the tag may be comprised of aluminum, plastic, or other rust resistant materials.

At event 910, a pet is lost such that the pet's location may be unknown to the pet owner. At event 912, the pet is found such that the pet's location may be discovered by an individual other than pet owner. At event 914, the iris identification code may be retrieved. In one embodiment, the iris identification code may be retrieved by scanning the pet's iris. In such an embodiment, a second iris image may be rendered when the pet's iris is scanned by a scanning device such that the iris identification code may be displayed on the scanning device. In another embodiment, the second iris image may be sent to the universal iris database and matched with the first iris image. As a result, the second iris image it then associated with the corresponding iris identification code. In an alternative embodiment, the iris identification code may be retrieved by reading the iris identification code from the tag that is being worn by the pet.

At event 916, the user 202 searches the iris database using one or more search engines. The user 202 may be an individual who has located a lost pet. Searching the iris database may comprise using the iris identification code retrieved from the pet as a search term in the one or more search engines, such that the iris record is listed first in one or more search results. In one embodiment, the one or more search results may comprise the contact information associated with the pet owner. Inasmuch, at event 918, the individual who has located the lost pet may contact the pet owner using the contact information provided in the one or more search results such that the pet may be reunited with the pet owner.

FIG. 10 illustrates an exemplary search results page 1000, according to embodiments of the invention. As illustrated an identification code may be used as a search parameter 1002 for locating an identification record 110. In one embodiment, the identification database 108 may be queried using one or more search engines and a search parameter 1002 such that a link 1004 to the identification record 110, being displayed on a website. In some embodiments, the link 1004 is listed as the only result in the search results. In other embodiments, multiple results are listed and the link 1004 is listed first.

FIG. 11 illustrates a website page displaying the identifier information 1100. The website may include various parameters and/or pet related information such as internal search engines 1002, identifier codes 1004, information associated with the pet, photos, a contact form for contacting the pet owner 1200, and/or the like. FIG. 12 illustrates an exploded view of the contact form provided in FIG. 11. As illustrated, an individual who has located a lost pet may first specify information such as their email address and phone number 1202, at step 1. The individual may additionally provide a message to be sent to the pet owner 1204, at step 2. Upon filling out the contact form the individual may select the send button 1206 such that the contact information is anonymously sent to the pet owner.

FIG. 13 illustrates an email 1300, received by a pet owner, which specifies their lost pet has been found. The email may additionally indicate the contact information of the individual that has located the lost pet. In some embodiments, the message further comprises a link to the last known location of the pet. In such an embodiment, upon selecting the link, a map may be generated which indicates the last known location of the pet. As such, FIG. 14 illustrates a recovery map indicating the last known location of the pet. The recovery map may be generated on a page associated with the website and/or database 108 that displays or stores the plurality of identification records 110.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus configured for locating an object owner, the apparatus comprising:
    a non-transitory computer-readable storage medium including computer-readable program code stored therein;
    a processor operatively coupled to the computer readable storage medium and configured to execute the computer readable program code to:
        provide a microchip database having one or more microchip records stored therein, wherein the microchip database is queried using one or more general search engines for use in querying a worldwide network, and wherein the one or more general search engines are not internally associated with the microchip database;
        provide a microchip identification code such that the microchip identification code is associated with a microchip, wherein the microchip is implanted into an object;
        create a microchip record to be stored in the microchip database, wherein the microchip record is associated with the microchip identification code, wherein the microchip record comprises contact information associated with the object owner, and wherein the one or more general search engines are queried using a search term associated with the microchip record, and wherein creating the microchip record further comprises repeatedly posting the microchip record to a plurality of third party websites not associated with the microchip database in order to influence the ranking of the microchip record to be higher within one or more search results of the general search engines such the microchip record can be queried to be listed in one or more search results of the general search engine;
        receive, via a user interface associated with the microchip database, contact information from an individual, other than the object owner, that has located the object, wherein the individual's contact information is received via input into a contact form displayed on the user interface, and wherein the contact information associated with the object owner is not visible to the individual via the contact form;
        generate a message comprising the individual's contact information and a location of a lost object; and
        send the message to the object owner based at least in part on the contact information associated with the object owner, whereby the contact information associated with the object owner remains anonymous to the individual that has located the object.

2. The apparatus of claim 1, wherein the processor is further configured to repeatedly post the microchip record to one or more blog websites.

3. The apparatus of claim 1, wherein querying the microchip database comprises using the microchip identification code as the search term in the plurality of search engines.

4. The apparatus of claim 1, wherein the microchip emits a unique signal when scanned by a scanning device such that the microchip identification code is displayed on the scanning device.

5. The apparatus of claim 1, wherein the processor is further configured to provide information for manufacturing an object tag such that the microchip identification code is displayed on the object tag, wherein the object tag is attached to the object.

6. The apparatus of claim 1, wherein the processor is further configured to provide a user interface such that a user is able to enter information to be associated with the microchip record.

7. The apparatus of claim 1, wherein the processor is further configured to create a website, wherein the website is associated with the microchip database such that the microchip records are posted on the website, and wherein the website comprises built-in search capabilities for querying the microchip database.

8. The apparatus of claim 1, wherein the processor is further configured to contact the object owner.

9. A method for locating an object owner, the method comprising:
    providing a microchip database having one or more microchip records stored therein, wherein the microchip database is queried using one or more general search engines for use in querying a worldwide network, and wherein the one or more general search engines are not internally associated with the microchip database;
    providing a microchip identification code such that the microchip identification code is associated with a microchip, and wherein the microchip is implanted into an object;
    creating a microchip record to be stored in the microchip database, wherein the microchip record is associated with the microchip identification code, wherein the microchip record comprises contact information associated with the object owner, and wherein the one or more general search engines are queried using a search term associated with the microchip record, and wherein creating the microchip record further comprises repeatedly posting the microchip record to a plurality of third party websites not associated with the microchip database in order to influence the ranking of the microchip record to be higher within one or more search results of the general search engines such that the microchip record can be queried to be listed in one or more search results of the general search engine;
    receiving, via a user interface associated with the microchip database, contact information from an individual, other than the object owner, that has located the object, wherein the individual's contact information is received via input into a contact form displayed on the user interface, and wherein the contact information associated with the object owner is not visible to the individual via the contact form;
    generating a message comprising the individual's contact information and a location of a lost object; and
    sending the message to the object owner based at least partially on the contact information associated with the object owner, whereby the contact information associated with the object owner remains anonymous to the individual that has located the object.

10. The method of claim 9, wherein creating a microchip record further comprises repeatedly posting the microchip record to one or more blog websites.

11. The method of claim 9, wherein querying the microchip database comprises using the microchip identification code as the search term in the plurality of search engines.

12. The method of claim 9, wherein the microchip emits a unique signal when scanned by a scanning device such that the microchip identification code is displayed on the scanning device.

13. The method of claim 9, the method further comprising providing an object tag such that the microchip identification code is displayed on the object tag, wherein the object is attached to the object.

14. The method of claim 9, wherein creating a microchip record further comprises providing a user interface such that a user is able to enter information to be associated with the microchip record.

15. The method of claim 9, the method further comprising creating a website, wherein the website is associated with the microchip database such that the microchip records are posted on the website, and wherein the website comprises built-in search capabilities for querying the microchip database.

16. The method of claim 9, the method further comprising contacting the object owner.

17. A computer program product comprising a non-transitory computer-readable medium, wherein the computer-readable medium comprises computer-executable program code portions stored therein, and wherein the computer-executable program code portions comprise:

a first program code portion operable to provide a microchip database having one or more microchip records stored therein, wherein the microchip database is queried using one or more general search engines for use in querying a worldwide network, and wherein the one or more general search engines are not internally associated with the microchip database;

a second program code portion operable to provide a microchip identification code such that the microchip identification code is associated with a microchip, and wherein the microchip is implanted into an object;

a third program code portion operable to create a microchip record to be stored in the microchip database, wherein the microchip record is associated with the microchip identification code, wherein the microchip record comprises contact information associated with the object owner, and wherein the one or more general search engines are queried using a search term associated with the microchip record, and wherein creating the microchip record further comprises repeatedly posting the microchip record to a plurality of third party websites not associated with the microchip database in order to influence the ranking of the microchip record to be higher within one or more search results of the general search engines such that the microchip record can be queried to be listed in one or more search results of the general search engine;

a fourth program code portion operable to receive, via a user interface associated with the microchip database, contact information from an individual, other than the object owner, that has located the object, wherein the individual's contact information is received via input into a contact form displayed on the user interface, and wherein the contact information associated with the object owner is not visible to the individual via the contact form;

a fifth program code portion operable to generate a message comprising the individual's contact information and a location of a lost object; and a sixth program code portion operable to send the message to the object owner based at least partially on the contact information associated with the object owner, whereby the contact information associated with the object owner remains anonymous to the individual that has located the object.

18. The computer program product of claim 17, a seventh program code portion operable to repeatedly post the microchip record to one or more blog websites.

19. The computer program product of claim 17, a seventh code portion operable to cause a microchip to emit a unique signal when scanned by a scanning device such that the microchip identification code is displayed on the scanning device.

20. The computer program product of claim 17, a seventh program code portion operable to provide information for manufacturing an object tag such that the microchip identification code is displayed on the object tag, wherein the object is a tag attached to the object.

21. The computer program product of claim 17, a seventh program code portion operable to provide a user interface such that a user is able to enter information to be associated with the microchip record.

22. The computer program product of claim 17, a seventh program code portion operable to create a website, wherein the website is associated with the microchip database such that the microchip records are posted on the website, and wherein the website comprises built-in search capabilities for querying the microchip database.

23. The computer program product of claim 17, a seventh program code portion operable to contact the object owner.

* * * * *